United States Patent [19]

Braakman

[11] Patent Number: 4,993,808
[45] Date of Patent: Feb. 19, 1991

[54] DIRECTED OPTICAL SIGNALING

[75] Inventor: Herman W. T. Braakman, Bleiswijk, Netherlands

[73] Assignee: U.S. Philips Corporation, New York, N.Y.

[21] Appl. No.: 340,618

[22] Filed: Apr. 19, 1989

[30] Foreign Application Priority Data

May 18, 1988 [NL] Netherlands ............... 8801274

[51] Int. Cl.[5] .............. G02B 5/04; G02B 17/04; H03K 17/94
[52] U.S. Cl. ...................... 350/286; 350/112; 341/22
[58] Field of Search ............ 350/286, 287, 110, 112; 340/711, 815.13; 341/22; 362/800, 802

[56] References Cited

U.S. PATENT DOCUMENTS

| | | | |
|---|---|---|---|
| 3,144,643 | 8/1964 | Andersson | 340/711 |
| 4,874,913 | 10/1989 | Aoki et al. | 362/800 |
| 4,931,794 | 6/1990 | Haag et al. | 341/22 |

FOREIGN PATENT DOCUMENTS

| | | |
|---|---|---|
| 2825833 | 12/1979 | Fed. Rep. of Germany . |
| 3202080 | 10/1982 | Fed. Rep. of Germany . |
| 2168850 | 6/1986 | United Kingdom . |

Primary Examiner—Bruce Y. Arnold
Assistant Examiner—James Phan
Attorney, Agent, or Firm—Anne E. Barschall

[57] ABSTRACT

In order to improve the angle of sight and the light intensity of the light markings of keys on a keyboard, the keys are provided with a light conducting body arranged over the individual light sources of the individual light sources of the individual keys. This semiconducting body preferably has the form of a truncated wedge whose truncated top face substantially coincides with the key top face and the bottom directed towards the light source is composed of no less than two facets of which the light beam 5 incident on the facets emerges from the top face divergingly and in virtually non-coincident light beams.

13 Claims, 2 Drawing Sheets

DIRECTED OPTICAL SIGNALING

The invention relates to a keyboard comprising at least one key having a vertical recess and a light source for marking a condition defined by the key and arranged at some distance below the recess in the keyboard.

Such a keyboard wherein the vertical recess is formed by a drilling hole in which when the key is in depressed condition the light source in the form of a light emitting diode (LED) fits is widely known.

The LEDs that are used for this purpose have a limited angle of view. This is caused by the drop-like construction of the lens at the top of the LED and also by the fact that the LED must not protrude from the drilled hole so as to avoid damage to the LED when the key is depressed, as a result of which a portion of the light emitted by the LED is shielded and an undesirably narrow signaling face with too small an angle of view is obtained, having, in addition, a less favourable direction for the operator.

It is an object of the invention to obviate this drawback in a very efficient way, it being possible to bridge a distance between the light source and the signaling face without an appreciable loss of light intensity and creating at the same time a desired angle of view for the operator.

Thereto, the invention is characterized in that in the recess 7 a light conducting body 9 is arranged whose top forms the exit opening of a light beam coming from the light source and whose top is located substantially in the top face of the key 2 and the bottom, directed towards the light source 8, comprises at least two facets 13, 14 for allowing the light coming from the light source to emerge in the desired direction at least in two substantially non-coinciding light beams ($\delta$, $\beta$), as a result of which the angle of exit exceeds the angle of entry of the light from the light conducting body 9.

In this context it is highly advantageous that the light conducting body together with the key cap can be spray-painted as a whole. The invention is based on the understanding that by means of the facets at least one virtual light source is created not coinciding with the light source 8 as a result of which the angle of exit exceeds the angle of entry of the light and whose position determines the desired direction of transmission.

An extremely advantageous embodiment is characterized in that the light conducting body 9 has the form of a truncated wedge whose truncated side forms the top side. In a preferred embodiment the first facet 13-1 has a flat plane of refraction which has a position such that light which is pulled in by the first facet 13-1 runs substantially parallel with a first lateral face 11-1 bordering on this plane of refraction of facet 13-1 of the light conducting body 9-1 and the facet 14-1 bordering on the first facet 13-1 has a bent surface refracting pulled-in light in a manner such that it emerges at a second angle $\beta$ which substantially matches the emerging light beam coming from the first facet 13-1.

This enables in a simple way an enhanced angle of view.

A further embodiment is characterized in that the second facet 14-2 has a position such that the pulled-in light is reflected against the first side 11-2 in the light conducting body 9-2 before it emerges therefrom.

Consequently, the light pulled in by the second facet emerges on the other side, of the light pulled in by the first facet, from in the case discussed hereinbefore.

A still further embodiment is characterized in that a third facet 15-3 is arranged between the second facet 14-3 in a second lateral face 12-3 facing the first lateral face 13-3, in that the third facet 15-3 has a bent surface which is arranged in a manner such that the light pulled in is reflected against the second lateral face 12-3 and the first lateral face 11-3, in this order, before emerging at a third angle $\alpha$ which substantially matches the first exit angle $\beta$-2.

This is advantageous in that a further enhancement of the overall angle of exit is realised in a simple way.

The invention and its advantages will be further explained with reference to the embodiments represented in the drawing Figures, whereas corresponding components are designated by the same reference numerals and in which.

Figure 1:
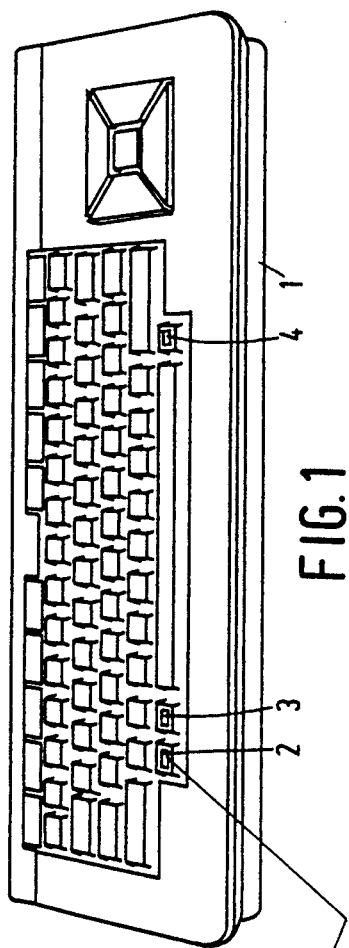
FIG. 1 shows a keyboard in accordance with the invention.

The keyboard 1 represented in FIG. 1 comprises a large number of keys used for operating individual functions.

In addition to the home computer used with the keyboard represented in FIG. 1 there are many advanced electronic apparatuses having many functions have to be operated, for example, advanced technology telephone sets, personal computers, "minitel" equipment, medical equipment etc.

In order to maintain the smallest possible number of keys for controlling these apparatuses double functions are assigned to keys, for example small letters and capitals or a different type of alphabet etc.

The conversions between these functions are effected in the embodiment by means of the keys 2, 3 and 4.

In this respect it is necessary to visualize the fact that these functions are switched on or off.

To avoid these keys being fixed in specific positions, as is customary in the case of mechanical keyboards, a light marking is applied to this advanced equipment so that no more than a single type of switch linked with the keys can be applied to the whole keyboard.

Figure 2:
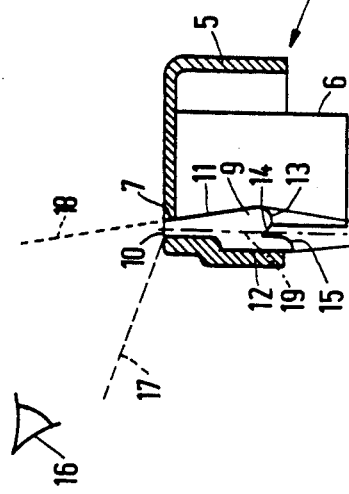
FIG. 2 shows a key of the keyboard according to the invention.

Such a key 2, comprising light marking, is represented in a diagram in FIG. 2. This key comprises a key cap 5 provided on a switch-on 6 of a switch not shown any further.

In prior art keyboards the key has a vertical recess 7, possibly covered by a transparent plastic layer to avoid impurities. Perpendicularly below the recess 7 is a light source, for example a light emitting diode (LED) at the end of a "fibre" coupled to a light source arranged at some distance.

The light source 8 has an angle of aperture $\alpha$ at which the light leaves the light source 8. In order to guarantee a free stroke of the key the recess 7 is introduced at some distance above the light source 8, so that on the one hand only a small portion of the light of the light source 8 will pass through the recess 7 and on the other hand the light leaves the recess 7 in line with the axis connecting light source 8 with the recess 7, so that a keyboard operator will see not more than the stray light caused by the edges of the opening 7.

To improve visibility, a light conducting body 9 is inserted in the recess.

Figure 3:
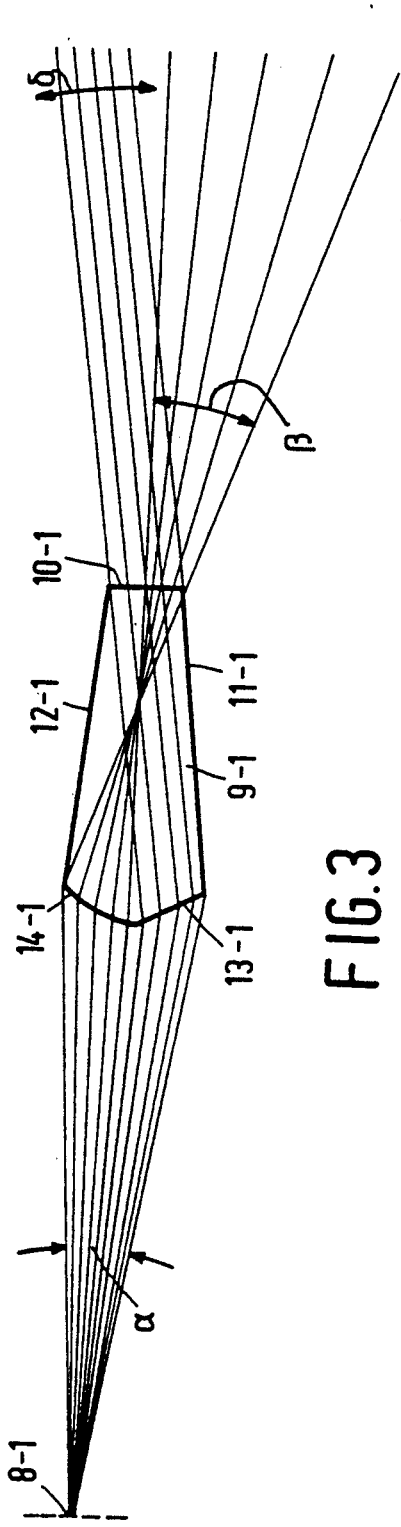
FIG. 3 shows a first embodiment of the light conducting body in a key of the keyboard according to the invention.

Such a light conducting body 9-1 can have multiple forms provided that the side facing the light source comprises no less than two facets for magnifying in the desired direction the angle of exit of accepted light by the formation of at least one virtual additional light source. In a particularly advantageous embodiment the light conducting body 9-1 has the form of a truncated range, as shown in FIG. 3. This light conducting body has a top side 10-1, called the exit opening, from where the pulled-in light leaves. This top side is preferably situated in the top face of the key 2, 3 or 4 as is also represented in FIG. 2. Furthermore, the light conducting body 9-1 is bounded by a first side 11-1, a second side 12-1 and a bottom side called the entrance and divided up into facets 13-1 and 14-1. The depth (not shown) of the light conducting body 9 can be chosen at random, but will generally correspond with the height of the entrance opening because the light beam coming from the source is generally rotationally symmetrical. The bottom side is preferably so wide as to have the light conducting body 9-1 pull in at an angle of radiation $\alpha$ substantially all the light emitted by the light source 8-1 represented in the diagram.

The bottom side is divided up into a number of facets in this embodiment being a number of two 13-1 and 14-1. The surface of facets 13 is chosen to be flat in all embodiments but can also have a suitably bent shape. The surface of facet 13-1 is positioned relative to the incident light beam such that the incident light without being reflected to one of the sides 11-1 and 12-1 exits at a first angle through the entire exit opening. This implies that the light pulled in by facet 13-1 runs substantially parallel with the first side 11-1. The surface of facet 14-1 is bent and has such a position relative to the incident light and such a curve that the light beam incident on this surface 14-1 leaves the exit opening 10-1 as a divergent light beam, which is to say that it has a focus located within the light conducting body or a series of foci. In addition, the position of the surface facet 14-1 is chosen such that the associated light beam exits at a second angle $\beta$, which substantially matches the light beam at the angle $\delta$ coming from the first facet 13-1.

By using the light conducting body 9-1, comprising an entrance opening having facets 13-1 and 14-1, the following advantages are obtained. Firstly substantially all the light emitted by the light source 8-1 leaves through the exit opening 10-1 so that a maximum light intensity is realised. Secondly the light leaves the exit opening 10-1 at a larger angle $(\delta+\beta)$ than the angle at which it is pulled in $(\alpha)$ obtaining an improved angle of sight $(\delta+\beta)$. Finally, the overall angle $(\delta+\beta)$ at which the light leaves is situated on substantially one side of the line 19 (see FIG. 2) between the light source 8-1 and the heart of the exit opening 10-1 so that with a proper positioning of the light conducting body 9-1 in the key 2, 3 or 4 the light is emitted substantially to the front, which is to say in the direction of an operator sitting at the keyboard 1.

Figure 4:
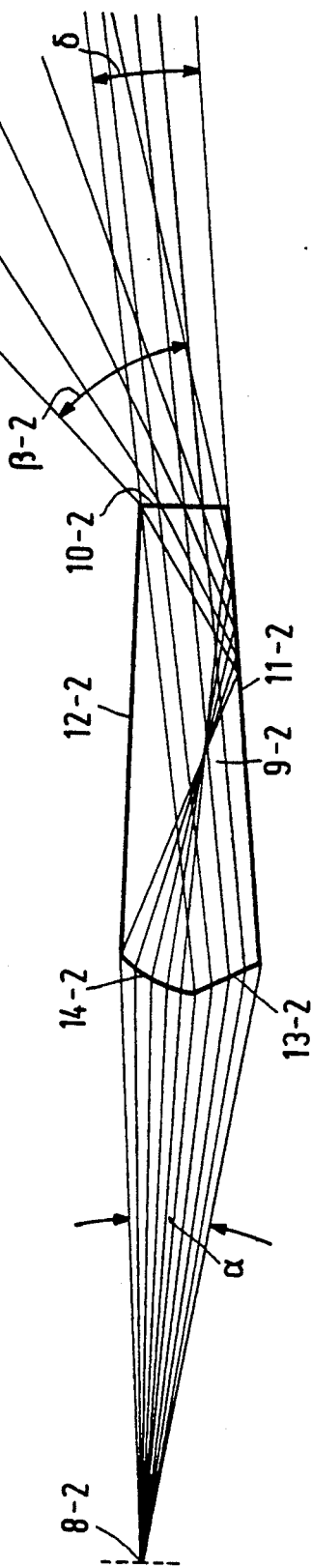
FIG. 4 shows a further embodiment of a light conducting body in a keyboard according to the invention.

An improvement is obtained by using the conducting body 9-2 represented in FIG. 4.

This light conducting body 9-2 is, exept for the facet 14-2, substantially identical with the light conducting body 9-1 represented in FIG. 3.

The facet 14-2 has such a curve and such a position that the light beam hitting this facet leaves the exit opening 10-2 also as a divergent light beam but after being reflected against the side face 11-2 in the light conducting body 9-2. The position of facet 14-2 is then selected such that the angle $\beta$-2 at which the light emerges virtually matches the emerging light at the angle $\delta$ which is pulled in by the facet 13-2.

By making use of the reflection against the side face 11-2 which orders on facet 13-2 the following advantages are obtained.

In the first place this enables the light pulled in by facet 14-2 to emerge on the other side, of the light pulled in by facet 13-2, from in the embodiment represented in FIG. 3, at which a positioning in the key 2, 3 or 4 is realised turmed through 180° along the longitudinal axis of the wedge-like light conducting body. In the second place this enables an enlarged exit angle $\beta$-2 because due to the reflection of the side face 11-2 a virtual light source is realised which forms a much larger angle to the perpendicular on the top face 10-2 than as possible in the embodiment represented in FIG. 3.

Figure 5:
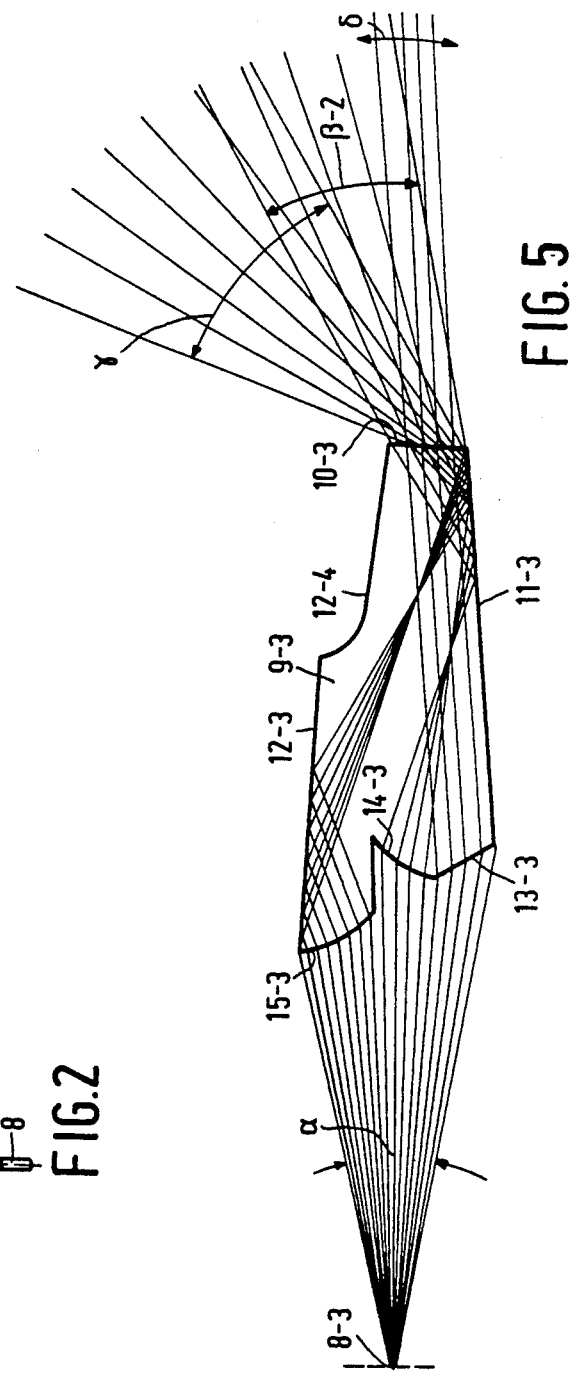
FIG. 5 shows a preferred embodiment of a light conducting body of a keyboard according to the invention.

A further improvement is obtained by distributing the entrance opening over more than two facets, for example over the three facets as represented in FIG. 5. The light conducting body 9-3 represented in this Figure corresponds with the light conducting body 9-2 shown in FIG. 4 except for the facet 15-3. The facet 15-3 has a position such that the light entering this facet 15-3 originating from the light source 8-3 is reflected twice, that is to say a first time against the second side face 12-3 and a second time against the first side face 11-3. This makes the light emerging from the exit 10-3 apparently originate from a virtual light source which forms an even larger angle to the perpendicular on the plane of the exit opening 10-3 than the afore-described virtual light source of the emerging light pulled in by facet 14-3. In addition, the curve of facet 15-3 is chosen such that a diverging light beam leaves the exit opening 10-3 at an angle $\gamma$ and the position of facet 15-3 and of the second reflecting side face 12-3 is chosen with respect to the first reflecting side face 11-3 such that the angle $\gamma$ at which the light emerges substantially matches the angle $\beta$-2 at which the light emerges and is pulled in by facet 14-3.

When positioning the light conducting body 9-3 as shown in FIG. 5, in a key 2, 3 or 4 in a way as represented in FIG. 2, an operator of the keyboard diagrammatically represented in FIG. 2 by an eye 16, will always find himself in the outgoing light beam of which the boundary lines are represented in FIG. 2 by means of dashed lines 17 and 18.

From the light conducting body 9-3 represented in FIG. 5 the side face 12-3 is deepened over a portion 12-4 so as to remove the difference between the position of the reflecting portion of side wall 12-3 and the height of the exit opening 10-03. This variation can naturely be realised in a great many ways.

It will be evident that an even larger number of facets having multiple reflection against the side faces 11 and 12 is possible for realising a still wider emerging light beam.

In addition, it is possible also in the depth (that is to say perpendicular to the face in the drawings) to realise the facets and/or the exit face in a bent shape so that also the light beam will diverge in the plane perpendicular to the drawing.

The light emitting body 9 can be separately manufactured and installed in the key 2, 3 or 4. However, it is equally feasible to manufacture the light conducting body 9 together with the key cap 5 as one complete injection moulding.

What is claimed is:

1. A keyboard comprising
   (a) at least one key that includes a vertical recess,
   (b) at some distance below the recess, a light source for marking a condition defined by the key, and
   (c) in the recess (7), a light conducting body (9) having
      (i) a top which forms an exit opening for a light beam, coming from the light source, the top being located substantially in the top face of the key (2),
      (ii) a bottom directed towards the light source (8), and
      (iii) at least two facets (13, 14) for allowing the light beam to emerge in a desired direction simultaneously as at least first and second substantially non-coinciding portions of the light beam ($\delta$, $\beta$), as a result of which an angle of exit subtended by the light beam exceeds an angle of entry subtended by light coming from the light source to the light conducting body (9).

2. A keyboard as claimed in claim 1, wherein the light conducting body (9) has the form of a truncated wedge whose truncated side forms the top side.

3. The keyboard as claimed in claim 2, wherein
   the facets are located in the bottom of the light conducting body,
   a first one of the facets (13-1) has a flat refraction plane which has a position such that light entering the light conducting body via the first facet (13-1) runs substantially parallel with a first side face (11-1) of the light conducting body (9-1) before emerging as the first portion, subtending a first angle, and
   a second one of the facets (14-1), having an edge bounding the first facet (13-1), has a curved surface on which light, entering the light conducting body from the light source via the second facet, is refracted such that it emerges as the second portion, subtending a second angle ($\beta$) which is substantially contiguous with the first angle, so that the light beam is substantially continuous over the first and second angles.

4. The keyboard as claimed in claim 3, wherein the second facet (14-2) has a position such that the light entering the light conducting body via the second facet is reflected against the first side face (11-2) in the light conducting body (9-2) before that light emerges as the first portion.

5. The keyboard as claimed in claim 4, further comprising a third facet (15-3) arranged between the second facet (14-3) and a second side face (12-3) of the light conducting body, the second side face facing the first side face (11-3), the third facet (15-3) having a bent surface such that light entering the light conducting body from the light source, via the third facet is refected against the second side face (12-3) and the first side face (11-3), in this order, before emerging as a third portion of the light beam, subtending a third angle ($\gamma$) which is substantially contiguous with the first angle ($\beta$-2), so that the light beam is substantially continuous over the first, second, and third angles.

6. The keyboard as claimed in claim 1, wherein the light source (8) is a light emitting diode.

7. The keyboard as claimed in claim 1 wherein the light source comprises a light emitting diode at the end of a fibre.

8. A key, for use in a keyboard, comprising
   (a) a vertical recess, for locating above a light source which marks a condition defined by the key, and
   (b) in the recess (7), a light conducting body having
      (i) a top which forms an exit opening of a light beam, coming from the light source, the top being located substantially in the top face of the key (2),
      (ii) a bottom directed towards the light source (8), and
      (iii) at least two facets (13), (14) for allowing the light beam to emerge in a desired direction simultaneously as at least first and second substantially non-coinciding portions of the light beam ($\delta$, $\beta$), as a result of which an angle of exit subtended by the light beam exceeds an angle of entry subtended by light coming from the light source to the light conducting body (9).

9. The key of claim 8 wherein the light conducting body (9) has the form of a truncated wedge whose truncated side forms the top side.

10. The key of claim 9, wherein
    the facets are located in the bottom of the light conducting body,
    a first one of the facets (13-1) has a flat refraction plane which has a position such that light entering the light conducting body via the first facet (13-1) runs substantially parallel with a first side face (11-1) of the light conducting body (9-1) before emerging as the first portion, subtending a first angle, and
    a second one of the facets (14-1), having an edge bounding the first facet (13-1), has a curved surface on which light, entering the light conducting body via the second facet, is refracted such that it emerges as a second portion, subtending a second angle ($\beta$) which is substantially contiguous with the first angle, so that the light beam is substantially continuous over the first and second angles.

11. The key as claimed in claim 10, wherein the second facet (14-2) has a position such that the light entering the light conducting body via the second facet is reflected against the first side face (11-2) in the light conducting body (9-2) before that light emerges from the light conducting body.

12. The key as claimed in claim 11, further comprising a third facet (15-3) arranged between the second facet (14-3) and a second side face (12-3) of the light conducting body, the second side face facing the first side face (11-3), the third facet (15-3) having a bent surface such that light entering the light conducting body via the third facet is reflected against the second side face (12-3) and the first side face (11-3), in this order, before emerging as a third portion of the light beam, subtending a third angle ($\gamma$) which is substantially contiguous with the first angle ($\beta$-2), so that the light beam is substantially continuous over the first, second, and third angles.

13. A cap for a key for use in a keyboard, the cap defining a cavity for containing a light conducting body for conducting light from a light source to a top of the key, the light conducting body having (a) a top which forms an exit opening of a light beam, coming from the light source, the top being located substantially in the top face of the key (2), (b) a bottom directed towards the light source (8), and (c) at least two facets (13), (14) for allowing the light beam to emerge in a desired direction simultaneously in at least two substantially non-coinciding light beams ($\delta$, $\beta$), as a result of which an angle of exit subtended by the light beam exceeds an angle of entry subtended by light coming from the light source to the light conducting body (9).

* * * * *